United States Patent [19]
Korotky et al.

[11] Patent Number: 5,477,375
[45] Date of Patent: Dec. 19, 1995

[54] OPTICAL SOLITON GENERATOR

[75] Inventors: Steven K. Korotky, Toms River; John J. Veselka, Freehold, both of N.J.

[73] Assignee: AT&T Corp., Murray Hill, N.J.

[21] Appl. No.: 56,033

[22] Filed: Apr. 30, 1993

[51] Int. Cl.⁶ .............................. H04B 10/04; B02B 6/10
[52] U.S. Cl. .............................. 359/264; 359/183; 385/3; 385/5
[58] Field of Search .................................. 359/183, 184, 359/264, 279; 385/3, 5; 372/22, 25

[56] References Cited

U.S. PATENT DOCUMENTS

| | | | |
|---|---|---|---|
| 4,553,810 | 11/1985 | Alferness et al. | 359/264 |
| 4,797,641 | 1/1989 | Djupsjobacka | 359/264 |
| 5,031,235 | 7/1991 | Raskin et al. | 359/183 |
| 5,040,865 | 8/1991 | Chen et al. | 359/264 |
| 5,157,744 | 10/1992 | Korotky | 385/3 |
| 5,303,079 | 4/1994 | Gnauck et al. | 359/188 |
| 5,381,426 | 1/1995 | Fontana et al. | 372/25 |

FOREIGN PATENT DOCUMENTS

| | | |
|---|---|---|
| 622916 | 11/1994 | European Pat. Off. . |
| 2245790 | 1/1992 | United Kingdom . |

OTHER PUBLICATIONS

Hasegawa, A., Opt. Lett. (USA), vol. 9, #7, pp. 288–290; Jul. 1984; abst. only provided herewith.

Primary Examiner—Nelson Moskowitz

[57] ABSTRACT

An optical pulse generator for producing a soliton pulse train having a modulator which amplitude and phase modulates an optical frequency output of a continuous optical wave source. The modulator is driven by first and second harmonically related continuous sinusoidal waves from first and second CW voltage sources and the generator includes a pulse compression means for producing at the output of the generator a soliton pulse train.

19 Claims, 3 Drawing Sheets

OPTICAL SOLITON GENERATOR

FIELD OF INVENTION

This invention relates to optical pulse generation and, more particularly, to an optical pulse generator for use with the soliton propagation mode of intelligence bearing optical pulse trains.

BACKGROUND OF THE INVENTION

In the propagation of optical pulses over extreme distances, such as, for example, transoceanic distances, numerous parameters associated with such transmission limit the capacity of the optical fiber cable system through which the optical pulses are transmitted and, hence, the amount of intelligence that can be transmitted. The most obvious of such parameters is fiber loss, which degrades and diminishes the pulses passing therethrough. In general, such loss can be compensated by periodic pulse regeneration and amplification. Thus, in an extremely long cable transmission system, spaced regenerators are used for periodically restoring the pulses to a viable condition. Most recently, the use of erbium doped fiber amplification incorporated in the transmitting optical fibers has made it possible to transmit multi-gigabit per second pulse signals over extreme distances, such as transoceanic, without the necessity of regeneration of the signals. Thus, cable or fiber loss can be substantially eliminated as a factor in the transmission of pulse signals, leaving the parameters of fiber dispersion, fiber nonlinearities and amplifier noise as the limiting factors. As discussed in U.S. Pat. No. 5,157,744 of Korotky, optical fibers are not strictly linear, but have a small amount of nonlinearity in their transmission characteristics which make possible a pulse transmission mode in the optical fiber that is effectively immune from the aforementioned pulse degradation factors. As will be discussed more fully hereinafter, this mode, known as 'soliton propagation", effectively balances out the aforementioned factors provided the pulses have a required power level and hence velocity of propagation and a pulse shape in both the time and frequency domains that is optimum for compensating dispersion at a given power level and for reducing interference and cross-talk among pulses. Coupled with erbium doped amplification, which maintains the power required for soliton propagation, it is possible to transmit over large distances with minimum pulse degradation and loss resulting from the aforementioned factors as well as cross-talk. In soliton propagation, there is very little interaction among differing wavelength channels, hence, an additional significant advantage of such propagation is that wavelength division multiplexing (WDM) may be used to increase further the fiber capacity.

Prior art arrangements for generating pulses for use in soliton transmission have most often comprised some form of mode-locked laser. Such a pulse generator produces pulses having a bit rate that is tied to the time of a round trip of the laser cavity. It can be appreciated that extreme precision in sizing the cavity resonator is required for a given frequency, and tunability of repetition rate and pulse width is not easily realized. As a consequence, such a mode-locked laser pulse generator is itself a limiting factor in the transmission system.

The prior art pulse generator as herein discussed may comprise a semi-conductor injection laser that has a continuous wave (CW) non-modulated output. The output is then fed to an optical modulator having a switching characteristic to which is applied a pulse waveform modulating voltage. A Mach-Zehnder interferometric type of modulator has generally been preferred for such systems. However, a high-repetition-rate electrical pulse waveform is difficult to produce and propagate.

The present invention is, therefore, directed towards the reduction or elimination of the use of complex wave forms in an improved soliton pulse generator.

SUMMARY OF THE INVENTION

The present invention is a pulse generator for producing pulses appropriate for soliton mode transmissions which has controllable pulse outputs over a wide range of frequencies. In a preferred embodiment, the pulse generator comprises a CW laser, the output of which is applied to an amplitude modulator driven by a CW sinusoidal source. The modulator has a $\cos^2$ transfer function as will be discussed more fully hereinafter, and its output is a transform-limited return-to-zero (RZ) pulse train having a ratio of pulse period $T=1/f$ to pulse full width at half maximum (FWHM) $\tau$ of three ($T/\tau=3$) and approximately 100% modulation depth. Here f is the pulse repetition frequency. The output of the amplitude modulator is applied to a phase modulator which is also driven from a source of CW sinusoidal voltage to frequency chirp the input pulses, thereby broadening the optical spectral width of the pulse train.

Connected to the output of the phase modulator is a compression fiber having a group velocity dispersion characteristic at the operating wavelength which, in conjunction with the phase modulator, as will be discussed hereinafter, compresses the pulses to narrow widths. The ratio $T/\tau$ becomes greater than five ($T/\tau>5$) as a consequence of this compression. Thus, the output of pulse generator of the invention is a pulse train having waveforms in both the time and frequency domains which approach or equal a squared hyperbolic secant ($\text{sech}^2$) in shape, which is an ideal shape for soliton propagation.

The numerous features and advantages of the present invention will be more readily understood from the following detailed description read in conjunction with the accompanying drawings.

DETAILED DESCRIPTION

Soliton transmission requires pulses of a shape ($\text{sech}^2$ intensity envelope in time and frequency) and peak power such that the non-linearity of the optical fiber index exactly cancels the dispersive broadening characteristics of the fiber. When this condition obtains, soliton pulses can travel over extremely long distances without dispersion induced distortion in either the time or frequency domains.

Transform-limited optical pulses propagating through an optical fiber undergo pulse spreading as a result of group velocity dispersion arising from the dependence of the linear index of refraction $n_0$ of the fiber on frequency. In addition, there is a non-linear component $n_2$ of the fiber index of refraction such that the overall index of refraction n is given by $$n = n_0 + n_2 I \qquad (1)$$

where I is the light intensity. It can be shown that the peak power $P_1$ of a soliton pulse in a single mode optical fiber having an effective mode field area $A_{eff}$ is given by $$P_1 = \frac{\lambda A_{eff}}{\tau n_2 Z_0} \qquad (2)$$

where $$Z_0 = \frac{0.322 \pi^2 c \tau^2}{\lambda^2 D} \qquad (3)$$

where $Z_0$ is the soliton period, D is the dispersion coefficient, $\tau$ is the pulse width, $\lambda$ is the optical wavelength and c is the velocity of light. It can be seen from equations (2) and (3) that $n_2$ and D have the effect of canceling each other, thereby insuring a virtually distortion free soliton pulse. A detailed explanation of solirons is given in "Transmission of Stationary Nonlinear Pulses in Dispersive Dielectric Fibers" by A. Hasegawa and F. Tappert, *Applied Phip. Lett.*, Vol. 23, No. 3, (1973), at pp. 142–144.

When used to transmit information in optical form along an optical fiber transmission path, a soliton is an optical pulse signal that has: a special wave shape in the time domain, a specific optical frequency content in the frequency domain, no chirp, and an intensity that matches the dispersion characteristics of the optical transmission path.

Figure 1:
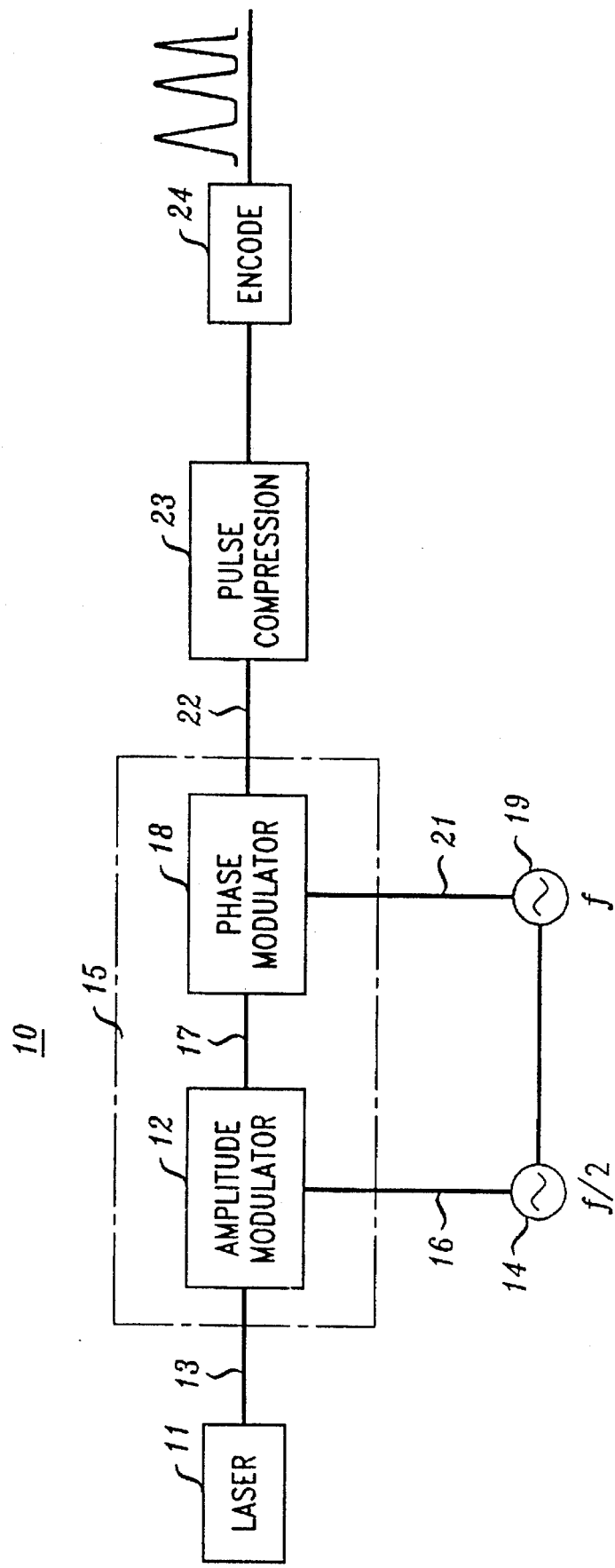
FIG. 1 is a block diagrammatic view of a soliton pulse generator embodying the principles and features of the present invention.

In FIG. 1, there is shown a block diagram of the soliton pulse generator 10 of the present invention. Generator 10 comprises a continuous wave (CW) laser source 11 of unmodulated optical signals. Laser 11 may be, for example, an InGaAsP distributed feedback type laser having an output wavelength $\lambda$=1.55 μm. The output of laser 11 is optically connected to a modulator 15, shown in dashed lines, which comprises an amplitude modulator 12 and a phase modulator 18. Modulator 12 may take any one of a number of forms such as, for example, an electrorefractive modulator, an electroabsorption modulator, a waveguide interferometer or directional coupler, or a Mach-Zehnder type of interferometric modulator, all of which are well known in the art. It has been found that a Y-branch Mach-Zehnder type of interferometer produces excellent results. The modulator 12 has applied thereto a CW sinusoidal voltage of frequency f/2 from a source 14 through an electrical connection 16 to produce an output optical signal from modulator 12. This output signal is a transform limited, return to zero (RZ) pulse train having a ratio of pulse period T to pulse width (FWHM) $\tau$ of $$T/\tau \approx 3 \qquad (4)$$

and virtually 100% modulation depth.

In practice, the amplitude modulator 12 has a $\cos^2$ transfer characteristic that is symmetrical about zero such that the output signal from modulator 12 is given by $$\text{Light out} = \cos^2\left( \frac{V}{V_s} \times \frac{\pi}{2} \right) \qquad (5)$$

where $V_s$ is the switching voltage. Thus, with the Mach-Zehnder modulator biased at zero the signal is sinusoidally modulated between the negative switching voltage and the positive switching voltage, thus in one cycle of RF voltage of frequency f/2, two pulses are produced hence the pulse repetition frequency becomes f.

The output of modulator 12 is connected through optical connector means 17 to the input of phase modulator 18. Phase modulator 18 may also take any of a number of form such as, for example, an compensated electrorefractive or electroabsorption phase modulator or a wave guide phase modulator, which are all well known. In the present embodiment of the invention, a Y-branch Mach-Zehnder interferometric phase modulator has been used to good effect. A CW sinusoidal wave modulating voltage of frequency f, phase locked to the voltage output of source 14, is supplied from a source 19 through electrical connection 21 to phase modulator 18. Modulator 18 functions to chirp the optical frequency of each pulse from amplitude modulator 12, thereby broadening the spectral width of the pulse train. While f and f/2 have been designated as the modulator frequencies, the broader case simply requires that they be harmonically related with the higher frequency being applied to modulator 18.

It is known to drive a phase modulator with a pulse train, or with a periodic parabolic shaped voltage waveform, to achieve chirping. In the generator of FIG. 1, it has been found that a sinusoidal voltage properly phase related to the amplitude modulator sinusoidal driving voltage provides the desired frequency chirping.

Although the output of the amplitude modulator 12 is shown serially connected to the input of phase modulator 18, they may be reversed so that the output of modulator 18 is connected to the input of modulator 12. It is also possible for both modulators 12 and 18 to be part of a unitary modulator structure where amplitude and phase modulation take place simultaneously yet are independently controllable.

The output of phase modulator 18 is connected by an optical fiber or waveguide 22 to a pulse compression means 23. Compression means 23 may take any of a number of well known forms such as, for example, an optical material having a group velocity dispersion characteristic such as a dispersive optical fiber, a pair of interconnected optical gratings, or a chirped grating. In the embodiment of FIG. 1, an optical fiber having a group velocity dispersion D of approximately 18 ps/km-nn at the operating wavelength has been used. The relative phases of the amplitude modulator voltage and the phase modulator voltage can be chosen such that the frequency chirp produced by phase modulator 18 causes the optical dispersion characteristic of the compression means 23 to compress the pulses. This occurs because the chirping instantaneously changes the optical frequency within the pulse broadening the optical spectrum, so that the trailing edge of the pulse tends to overtake the leading edge, thereby compressing the pulse. As a result, the pulse output from the pulse generator 10 has a ratio T/$\tau$>3. The value of this ratio is preferably 5 or better.

In FIG. 1, the pulse compression means 23 is shown as following both modulators 12 and 18. Means 23 may also be inserted between the two modulators 12 and 18, especially where phase modulator 18, precedes amplitude modulator 12.

The output of the pulse compression means 23 may be applied to a suitable encoder 24 for signal encoding the pulse train and/or to a suitable amplifier. Encoder 24 may also be connected between laser 11 and the modulator, or between the modulator 12 and 18, or between the modulator 15 and the compression means 23 as a means of compensating optical loss.

Figures 2A, 2B:
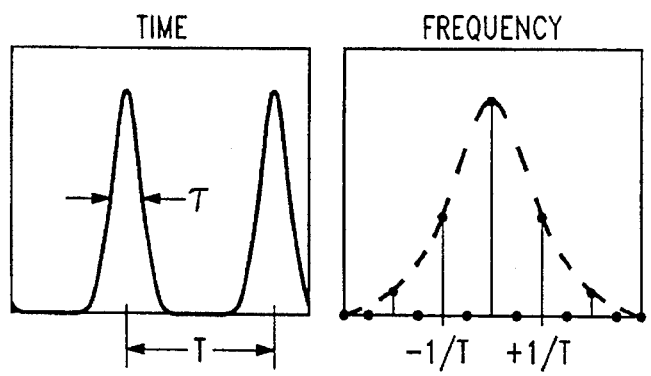
FIGS. 2A and 2B are, respectively, diagrams of predicted time and frequency domain waveform outputs of the circuit of FIG. 1.

FIGS. 2A and 2B depict the predicted pulse wave forms in both the time and frequency domains, respectively for the pulse generator of FIG. 1 for peak-to-peak sinusoidal phase modulation ($PM_{p-p}$) of $0.75\pi$ radians. The dashed line in the frequency domain indicates the shape of a $sech^2$ curve. It can be seen that the frequency spectrum of the pulses conforms to the dash line shape. The pulses in the time domain almost exactly coincide with the $sech^2$ curve, hence the latter is masked by the solid lines.

Figures 3A, 3B:
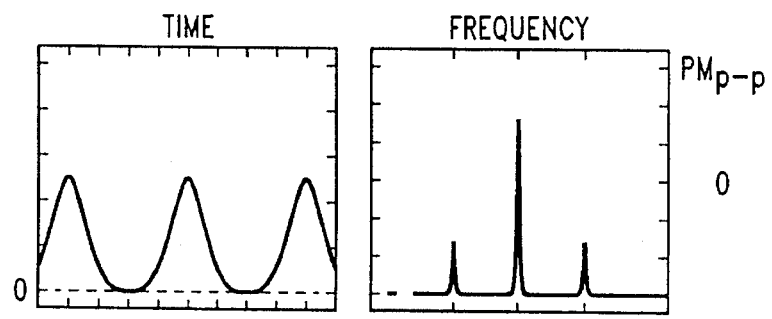
FIGS. 3A, 3B, 3C, 3D, 3E and 3F are actual time and frequency domain waveform outputs of the circuit of FIG. 1.
Figures 3C, 3D:
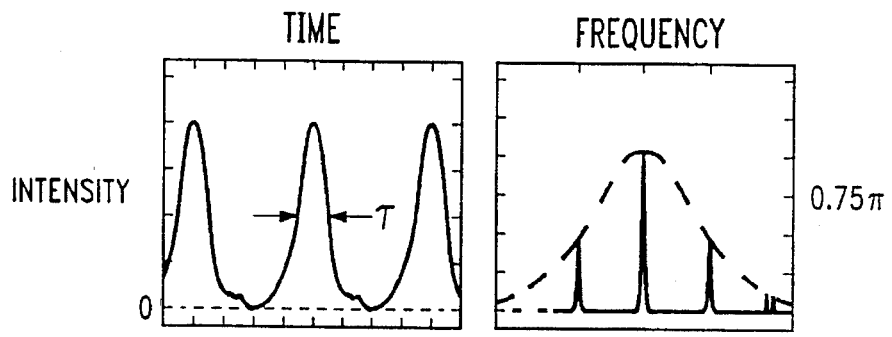
Figures 3E, 3F:
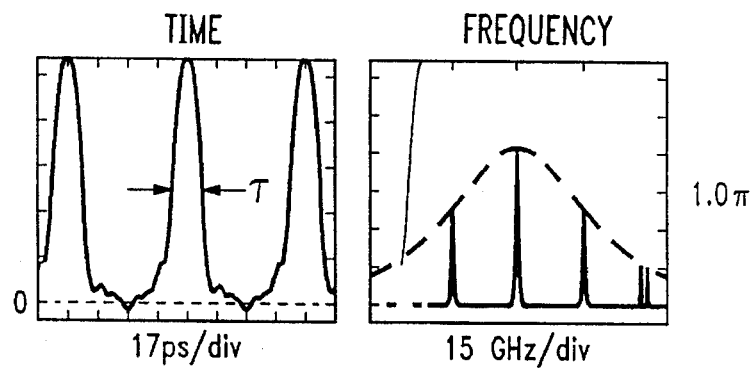

FIGS. 3A and 3B, 3C and 3D, and 3E and 3F indicate actual experimental results for 15 $GH_z$ pulse repetition rate for differing values of $P_{p-p}$. It can be seen in FIGS. 3A and 3B that the $P_{p-p}$ value of zero, the pulses in the time domain are too broad, i.e., FWHM equals approximately 20 ps, and the peak amplitude is too low. FIGS. 3C and 3D, on the other hand, show that, for $PM_{p-p}$ equals $0.75\pi$, the pulses in both the time and frequency domains correspond closely to the predicted results shown in FIGS. 2A and 2B with FWHM equal to 14 ps. For a $PM_{p-p}$ of $1.0\pi$, the FWHM equals approximately 10 ps, as shown in FIGS. 3E and 3F. Thus, the results shown in FIGS. 3C through 3F are pulses that fall within the soliton constraints.

Figure 4:
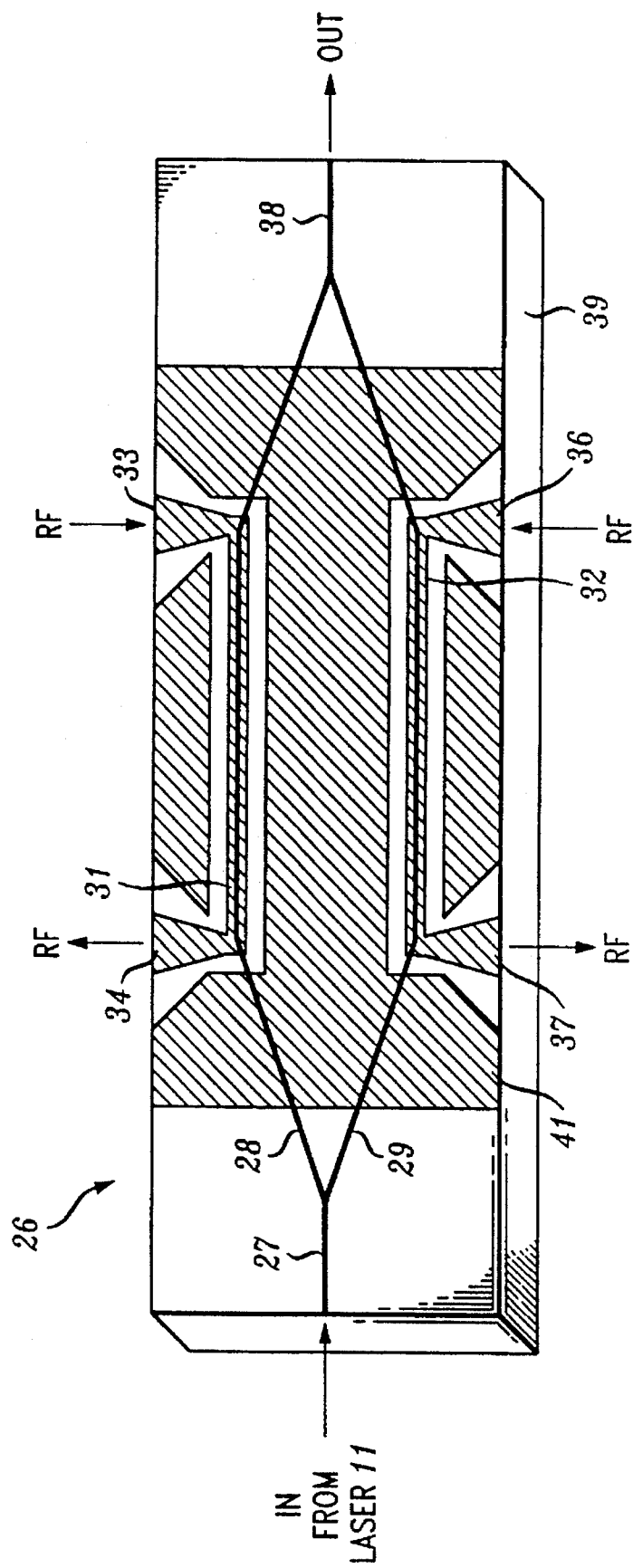
FIG. 4 is a view of one embodiment of a combined amplitude/phase modulator for use in the circuit of FIG. 1

As illustrated in FIG. 1, the various components of the pulse generator 10 are discrete, separate entities. In the present state of the art, it is possible to combine two or more of the discrete functions in a single unitary device. In FIG. 4, there is shown such a device 26 which functions as a combined amplitude and phase modulator with both modulations occurring simultaneously. Device 26 is configured in the form of a Y-branch Mach-Zehnder modulator having an input optical waveguide 27 which branches into two Y-branches 28 and 29, which pass along traveling-wave electrodes 31 and 32, respectively. Electrode 31 has an RF input electrode 33 connected to source 14 and 19, not shown, and an RF output electrode 34. In like manner, electrode 32 has an RF input electrode 36 also connected to RF source 14 and 19, not shown, and an RF output electrode 37. The voltage from source 19 is applied to input electrodes 33 and 36 in phase, while the voltage from source 14 applied to input electrode 36 is delayed relative to that applied to electrode 33 so that it is 180° out of phase relative thereto. Beyond the traveling wave regions defined by electrodes 31 and 32, optical wave guide arms 28 and 29 recombine into a single output waveguide 38. In the structure of FIG. 4, electrodes 31 and 32, which are in the form of coplaner waveguides, are totally independent of each other and are, as shown, individually addressable.

If the ratio of phase modulator (PM) to amplitude modulator (AM) is designated as $\alpha$, it can be shown that $$\alpha = \frac{(1+\eta)}{(1-\eta)} \quad (6)$$

where $$\eta = \frac{\Delta\beta_B}{\Delta\beta_A} \quad (7)$$

where $\nabla\beta_A$ is the change in propagation constant in arm 28 and $\nabla\beta_B$ is the change in propagation constant in arm 29. Thus, the value of J may be tuned to produce the preferred optical signal shape at output 38 for input into the compression fiber 23.

The device 26 comprises, for example, a lithium niobate ($LiNbO_3$) crystal substrate 39 having titanium diffused therein with a silicon dioxide ($SiO_2$) buffer layer 41 thereon. The electrodes are gold plated on the buffer layer 41. For a more complete description of the device 26, reference may be made to the *Technical Digest of the Topical Meeting on Integrated Photonic Research*, Montery, Calif., Paper TVG2, Optical Society of America, 1991, at pp. 53–54 "High Speed, Low Power Optical Modulator With Adjustable Chirp Parameter" by Korotky, et al. U.S. Pat. No. 5,157,744 of Korotky, referred to hereinafter, also includes a description of such a modulator. It is also possible, with the present state of the art, to integrate virtually the entire circuit of FIG. 1 onto a single substrate.

The invention as disclosed herein in the illustrative embodiment is a soliton pulse generator which is tunable and which does not require the use of complex voltage shapes in forming the pulses, relying instead upon simple sinusoidal waveforms to produce the desired soliton pulse train.

The foregoing description of an embodiment of the invention is for purposes of illustrating the principles, features, and advantages thereof. Numerous other arrangements or configurations may be implemented by workers skilled in the art without departure from the spirit and scope of the invention.

We claim:

1. Apparatus for generating a soliton pulse train comprising return-to-zero pulses having a repetition frequency of f, said apparatus comprising:

a source of continuous wave optical signal;

modulator means having an input for receiving the optical signal and producing an optical pulse output, said modulator means comprising means for amplitude modulating and phase modulating the optical signal;

a first voltage source for applying a first continuous wave sinusoidal modulating voltage having a first frequency to said modulator means;

a second voltage source for applying a second continuous wave sinusoidal modulating voltage having a second different frequency harmonically related and phase locked to the first sinusoidal modulating voltage to said modulator means; and optical pulse compression means having an input and an output for receiving the optical signal to produce said pulse train at its output.

2. The apparatus as claimed in claim 1 wherein said modulator means comprises an optical signal phase modulator having an input and an output and an optical signal amplitude modulator having an input and an output optically connected together in series.

3. The apparatus as claimed in claim 2 wherein said output of said amplitude modulator is optically connected to the input of said phase modulator.

4. The apparatus as claimed in claim 2 wherein the output of said phase modulator is connected to the input of said amplitude modulator.

5. The apparatus as claimed in claim 2 wherein said modulator means is an interferometric type modulator.

6. The apparatus of claim 5 wherein said interferometric type modulator is a Y-branch Mach-Zehnder type modulator.

7. The apparatus as claimed in claim 2 wherein said phase modulator is an interferometric type modulator.

8. The apparatus as claimed in claim 7 wherein said interferometric type modulator is a Y-branch Mach-Zehnder type modulator.

9. The apparatus as claimed in claim 1 wherein said modulator means comprises a Y-branch interferometric type modulator with said first and second voltage source being electrically connected to one arm of the Y and said first and second voltage source being electrically connected to the other branch of the Y.

10. The apparatus as claimed in claim 1 wherein said optical pulse compression means comprises an optical material having a group velocity dispersion characteristic.

11. The apparatus as claimed in claim 10 wherein said optical material is a dispersive optical fiber.

12. A soliton pulse generator having an output comprising:

a source of a continuous wave optical signal;

a first modulator having an input connected to the output of said source and an output;

a first source of a continuous wave sinusoidal modulating voltage at a frequency f electrically connected to said first modulator means;

a second modulator having an input and an output and having a $\cosine^2$ transfer function;

a second source of a continuous wave sinusoidal modulating voltage at a frequency f/2 electrically connected to said second modulator means;

the modulating voltages from said first and second sources being phase-locked together;

pulse compression means having an input and an output with its input being connected to at least one of the said outputs of said first and second modulator means producing at the output of the pulse generator a pulse train having a ratio of pulse period T to pulse full width at half maximum $\tau$ greater than three ($T/\tau>3$).

13. A pulse generator as claimed in claim 12 wherein said first and second modulator means are serially optically connected together.

14. A pulse generator as claimed in claim 12 wherein the output of said first modulator is optically connected to the input of said second modulator.

15. A pulse generator as claimed in claim 12 wherein the output of said second modulator is optically connected to the input of said first modulator.

16. A pulse generator as claimed in claim 12 wherein said first modulator comprises a Y-arm Mach-Zehnder type of interferometric modulator.

17. A pulse generator as claimed in claim 12 wherein said second modulator comprises a Y-arm Mach-Zehnder type of interferometric modulator.

18. A pulse generator as claimed in claim 12 wherein said first modulator and said second modulator are incorporated into a single unitary structure.

19. A method of generating a soliton pulse train comprising:

generating a continuous wave optical signal;

producing a return-to-zero pulse train having a ratio of pulse period T to pulse with t of approximately 3 ($T/t\cong3$) where T is the reciprocal of the pulse repetition frequency f and t is the pulse full width at half maximum (FWHM) by amplitude modulating the optical signal with a first continuous sinusoidal signal of frequency f/2;

broadening the spectral width of the pulses in the pulse train by phase modulating the optical signal with a second continuous sinusoidal signal of a greater frequency that is harmonically related to the frequency of the first signal and is phase locked thereto; and increasing the ratio of pulse period T to pulse width t to a value greater than 3 by compressing the pulses in the pulse train.

\* \* \* \* \*